J. M. DAVIE.
ADJUSTABLE SPACING COLLAR.
APPLICATION FILED JULY 1, 1916.
1,225,113.
Patented May 8, 1917.
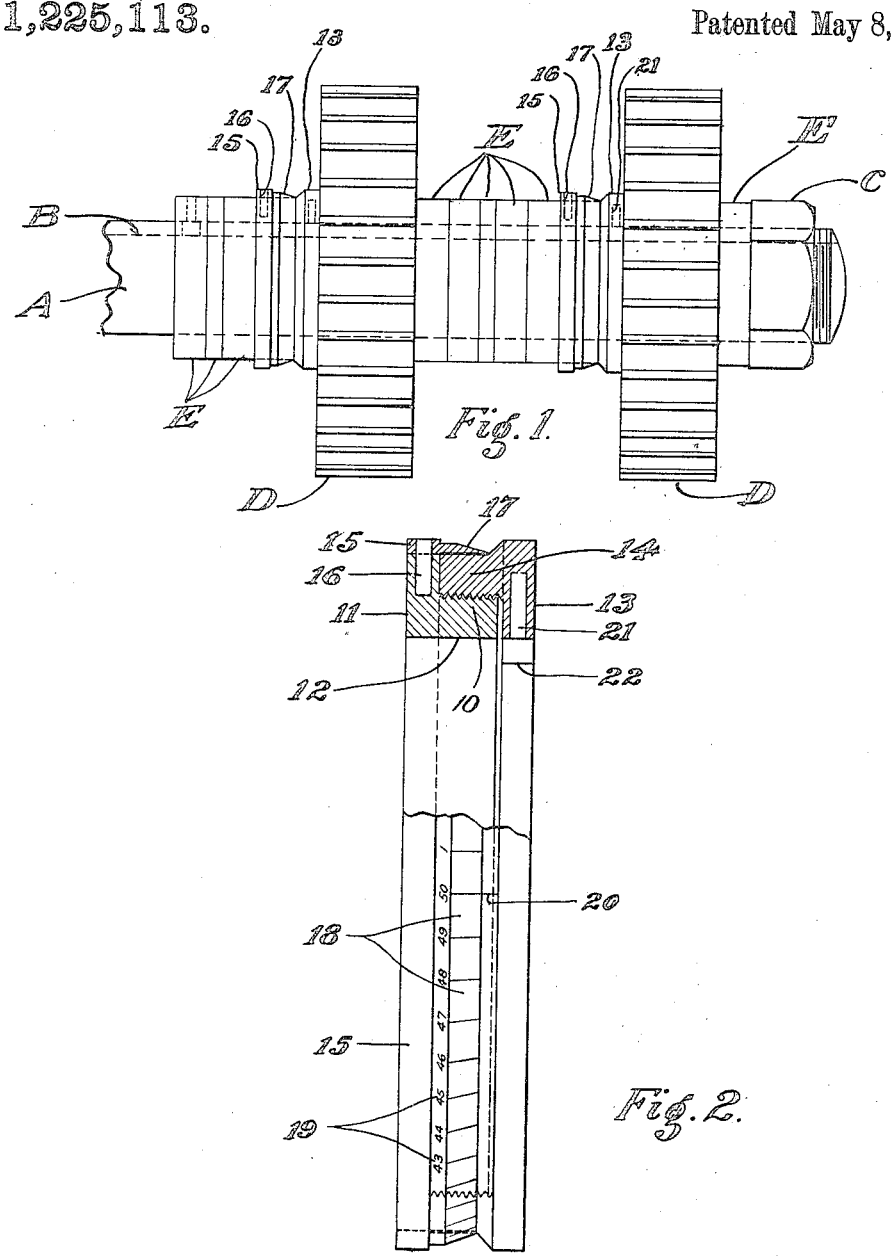

UNITED STATES PATENT OFFICE.

JOHN M. DAVIE, OF CLEVELAND, OHIO.

ADJUSTABLE SPACING-COLLAR.

1,225,113.  Specification of Letters Patent.  Patented May 8, 1917.

Application filed July 1, 1916. Serial No. 107,020.

*To all whom it may concern:*

Be it known that I, JOHN M. DAVIE, a citizen of the United States of America, residing at Cleveland, in the county of Cuyahoga and State of Ohio, have invented certain new and useful Improvements in Adjustable Spacing-Collars; and I hereby declare the following to be a full, clear, and exact description of the invention, such as will enable others skilled in the art to which it pertains to make and use the same.

This invention relates to new and useful improvements in collars for spacing cutters or saws on the arbors of milling machines and the like.

The object of the invention is to provide an adjustable collar by means of which cutters or saws can be quickly and accurately positioned on an arbor or spindle.

With the intention of securing the above mentioned advantages my invention consists in certain novel features of construction and combination of parts, the preferred embodiment of which is illustrated in the accompanying drawings, and hereinafter described in the specification, and particularly pointed out in the claims.

As is well known in mounting a milling cutter, saw or similar tool on the spindle or arbor of a milling machine or machine of similar construction, it is absolutely necessary that the cutting tool be positioned on the arbor with great accuracy. It is now the general custom in machine shops to use a plurality of sleeves and rings to secure the proper positioning of the cutter, and the fitting and trying of these rings consume considerable time, and the required accuracy is not always obtained.

By my invention I provide a two piece collar comprising a male and female member having correspondingly screw threaded parts, so that by rotating the members on each other the length or thickness of the collar can be increased or decreased as desired. The perimeter of the collar is graduated and indexed so that the exact width of the collar at any time can be read or positively ascertained. The threads on the members are naturally fine in order to secure delicate adjustment, and therefore in order to protect these threads from chips or dust a shield is provided which travels with one of the members and is always in position to cover the portion of the thread which would be exposed when the members are spaced apart.

Referring to said drawings, Figure 1 is a view in elevation showing a portion of the spindle or arbor of a milling machine with two cutters mounted thereon and employing two of my spacing devices. Fig. 2 is a side view on an enlarged scale of my spacing collar, a portion being broken away to more clearly illustrate the construction.

Again referring to the drawings A represents the arbor or spindle of a milling machine, and B a spline or groove in the arbor. C is a nut on the end of the arbor, and E represents the ordinary spacing rings or collars. My improved spacing collar comprises a male and female member, and the male member is shown at 10. This member comprises a flat ring or collar 11, the diameter of the opening in the collar varying of course according to the size of the spindle or arbor with which it is designed to be used. On one face of the collar is arranged an annular flange 12 which is provided with an exterior screw thread. The female member 13 likewise comprises a flat ring or collar which also carries an annular flange 14 which is provided with an interior screw thread which corresponds to the thread on the flange of the male member, and the diameter of said flange 14 is such that the flange on the male member can screw therein. Around the perimeter of the collar 11 is arranged a band 15 which is secured to the collar by means of pins 16. This band is made sufficiently wide so that it will overlap the flange 14 on the female member. The exterior surface of this band is preferably beveled downwardly toward the female member, as shown at 17, and the beveled surface is divided into spaces or graduated, as shown at 18; the graduations being numbered, as shown at 19. On the perimeter of the collar of the female member is arranged an index mark 20, and as this mark registers with the numbers on the male member, the exact thickness of the collar can be ascertained or secured by turning the members on each other. In one of the members, preferably in the female member is mounted a pin 21 which is preferably provided with a rectangular shaped portion 22 which is adapted to fit into and travel in the spline groove in the arbor or spindle when such a groove is present.

The operation of the device is as follows:—

The cutter is placed on the spindle together with my spacing device, and sufficient collars and sleeves are also placed on the spindle to secure the approximate adjustment of the cutter. The members of my spacing device are then rotated on each other, either to increase or decrease the width thereof until such width of the spacing collar is secured which, together with the sleeves and other collars, will locate the cutter in the exact position required on the spindle.

What I claim is:—

1. In a device of the character described, the combination of a pair of collars, one collar having an annular flange provided with an exterior screw thread, and the other collar having an annular flange provided with an interior screw thread, the diameters of the flanges being such that the interiorly screw threaded flange will receive the exteriorly screw threaded flange, and a band carried by one of the collars and arranged to overlap the flange on the other collar, the exterior surface of said band being beveled downwardly and provided on the beveled portion with a series of graduations.

2. In a device of the character described, the combination of two collars adapted to fit on the spindle of a machine, one of said collars being provided with means to prevent its rotation on the spindle, said collars carrying correspondingly screw threaded male and female members, and a band mounted on one of said collars and provided with a series of graduations arranged on the surface of said band for the purpose set forth.

In testimony whereof, I sign the foregoing specification, in the presence of two witnesses.

JOHN M. DAVIE.

Witnesses:
  VICTOR C. LYNCH,
  B. C. BROWN.